July 7, 1964 J. C. SPERY 3,139,980

WRAPPER TYPE CAN CARRIER

Filed Oct. 17, 1961

4 Sheets-Sheet 1

INVENTOR.
Joseph C. Spery

BY Irving Seidman

ATTORNEY

July 7, 1964 J. C. SPERY 3,139,980

WRAPPER TYPE CAN CARRIER

Filed Oct. 17, 1961 4 Sheets-Sheet 2

INVENTOR.
Joseph C. Spery

BY Irving Seidman
ATTORNEY

July 7, 1964 J. C. SPERY 3,139,980

WRAPPER TYPE CAN CARRIER

Filed Oct. 17, 1961

4 Sheets-Sheet 3

INVENTOR.
Joseph C. Spery

BY Irving Seidman

ATTORNEY

July 7, 1964 J. C. SPERY 3,139,980

WRAPPER TYPE CAN CARRIER

Filed Oct. 17, 1961

4 Sheets-Sheet 4

INVENTOR.
Joseph C. Spery

BY

Irving Seidman
ATTORNEY

United States Patent Office 3,139,980
Patented July 7, 1964

3,139,980

WRAPPER TYPE CAN CARRIER

Joseph C. Spery, 527 Madison Ave., Room 1002, New York, N.Y.

Filed Oct. 17, 1961, Ser. No. 145,677
16 Claims. (Cl. 206—47)

This invention relates to a foldable wrapper type can carrier. More particularly this invention relates to improvements in wrapper can carriers of the type disclosed in my co-pending applications Ser. No. 71,769, filed Nov. 25, 1960, now abandoned and Ser. No. 125,198, filed July 19, 1961.

Many different kinds of wrapper type carriers are known for packaging and distributing a variety of products sold in cans or the like, e.g. beer, soda, and the like. In all of the known constructions the cans are packed so as to be disposed in a single layer of tier. For this reason convenience of portage limited the size of a practical carrier to multiple cans disposed in rows of cans in side by side relationship.

Therefore, an object of this invention is to provide an improved wrapper type can carrier in which the cans carried thereby may be stacked one on the other within the carrier and thereby enable more cans to be packaged without increasing the girth dimension of the carrier.

A feature of this invention resides in the provision that the improved carrier encourages prospective purchasers to buy more than the usual number of cans otherwise retailed in a given unit package of known construction without affecting either the convenience of portage and/or the occupation of additional shelf space, which is of prime consideration to retail outlets.

Another feature of this invention resides in the provision that the amount of paperboard per unit can carried thereby is greatly reduced, while at the same time the nature of the wrapper carrier is such that more of its outer surface is visible for attracting the eye of a prospective buyer.

Also to enhance the sale of canned products distributed in such wrapper type carriers over that of a competing brand, resort is oftentimes made to the practice of attaching to each carton or carrier some other commercially desirable article. However, with the known carrier construction no facility was heretofore provided for attaching thereto such a sale inducing companion article.

Therefore, another object of this invention is to provide the improved can wrapper with suitable facilities for attaching thereto a suitable companion article at the option of the manufacturer of the products to be retailed by use of the carrier.

Another object of this invention is to provide means for attaching a companion article to the wrapper type can carrier in a manner so as to insure against loss and/or unintentional separation of the companion article from the wrapper carrier.

Still another object of this invention is to provide the carrier with novel can retaining tabs or flaps for retaining cans in stacked relationship therein, and which flaps are also constructed and arranged so as to permit loading of the cans therein with a minimum of obstruction.

Still another object is to provide novel can retaining flaps cut from the panels of the wrapper carriers and constructed integral therewith so as to prohibit the same from returning to the plane of its respective panel.

Another problem confronting the ultimate consumer of the various articles retailed in wrapper type carriers of known constructions is the difficulty of removing the outermost can from the wrapper. This difficulty is attributed to the fact that the cans are tightly held in place by retaining flaps engaging the chimes of the outermost or end cans and also due to the relatively stiff paperboard from which such cartons are made. Consequently such cartons are difficult to tear, even when so-called "easy tear" lines are provided to facilitate removal of the cans. Therefore, one has to struggle with the wrappers of known constructions in order to attain removal of a given can. Thus removal of a can was generally accomplished at the expense of destroying the carrier. For this reason numerous cartons or carriers of prior known constructions are unnecessarily destroyed, while still on the shelf of a retail outlet, by customers who desire to buy less than the number of units contained in a given wrapper type carrier.

Therefore, it is still a further object of this invention to provide an improved can retaining tab or flap which permits and facilitates the removal of individual cans without resulting destruction of the wrapper carrier.

Another feature of the invention resides in the provision that the wrapper is formed from a single, preformed blank of sheet material that can be readily folded to form the completed carrier, and which carrier can then be readily flattened for shipment to a point of use.

Other features and advantages will become readily apparent when considered in view of the following description and drawings in which.

Figure 3:
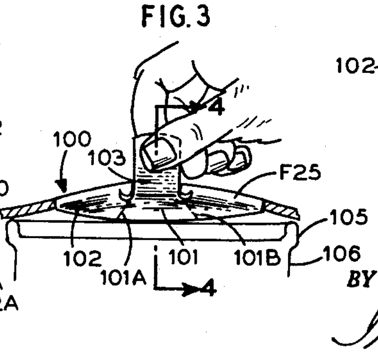

FIG. 3. is an enlarged detail illustrating the operation of an improved can retaining flap embodied in this invention.

Figure 4:
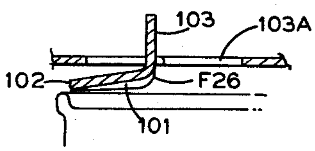

FIG. 4 is a section view taken along line 4—4 of FIG. 3.

Figure 1:
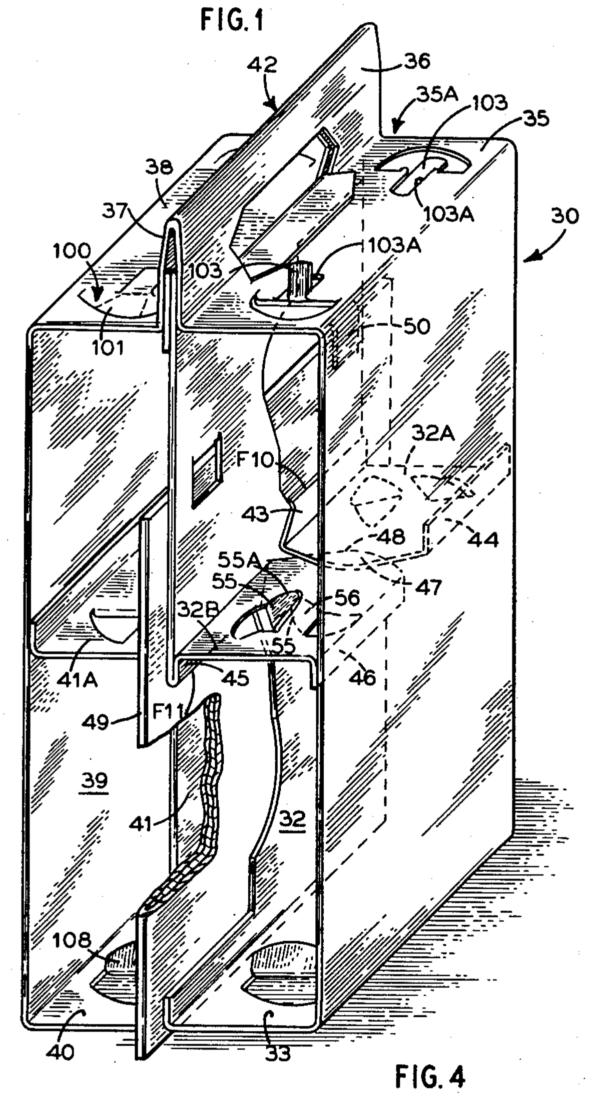
FIG. 1 is a perspective view of an improved wrapper type can carrier in accordance with this invention.
Figure 5:
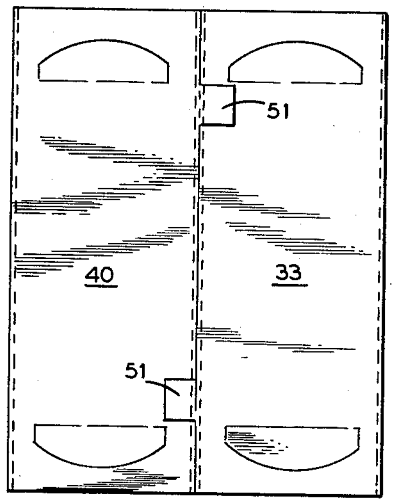
Figure 6:
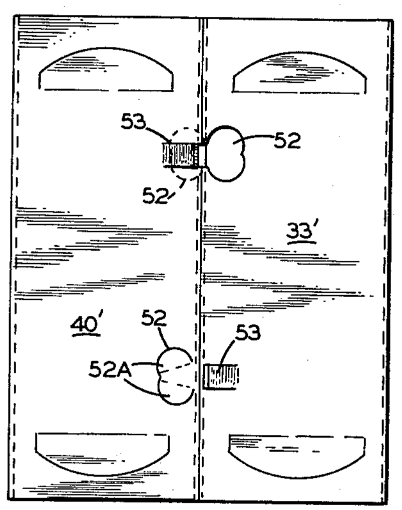
Figure 7:
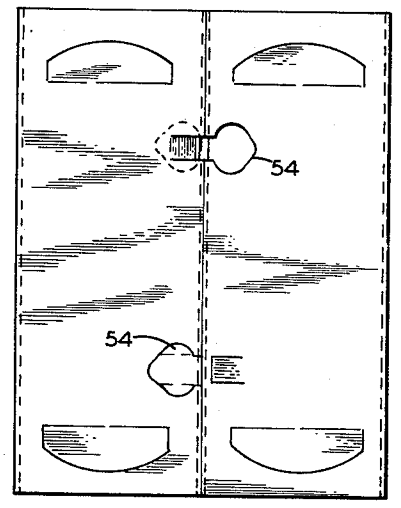

FIGS. 5 to 7 are modifications of the carrier of FIG. 1 illustrating a variety of alternate bottom constructions.

Figure 8:
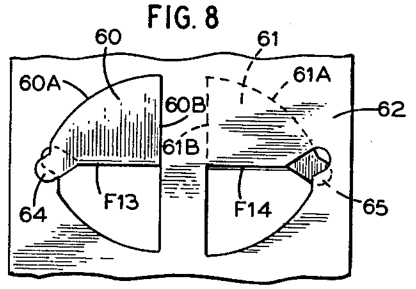

FIG. 8 illustrates a modified can retaining flap construction for use in retaining stacked cans within a carrier of FIG. 1.

Figure 9:
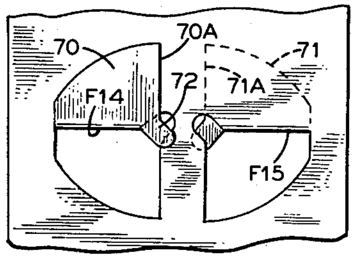

FIG. 9 is another modification of can retaining flaps for retaining stacked cans within a carrier.

Figure 10:
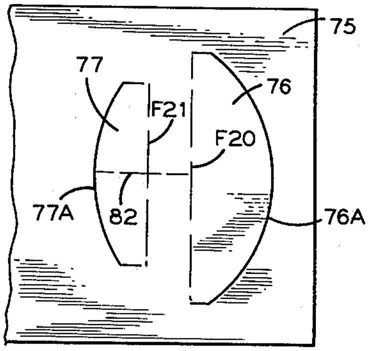

FIG. 10 is directed to still another form of can retaining flap shown in plan view and in blanked form.

Figure 11:
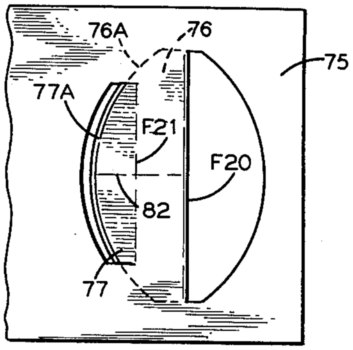

FIG. 11 is a plan view of the flap of FIG. 10 shown in folded position.

Figure 12:
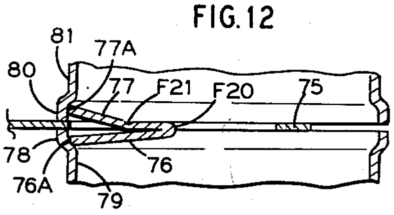

FIG. 12 is a section view of the flap of FIG. 11 illustrating the folded relationship thereof with stacked cans.

Figure 13:
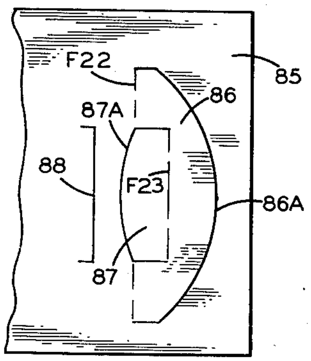

FIG. 13 is still another form of a can retaining flap shown in plan view as blanked.

Figure 14:
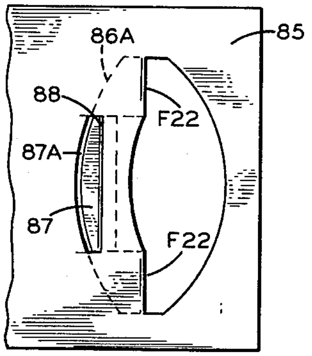

FIG. 14 is a plan view of FIG. 13 with the modified flap shown in folded position.

Figure 15:
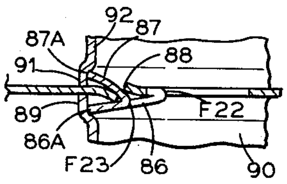

FIG. 15 is a section view taken through the modified flap of FIG. 14 to illustrate the relationship thereof with stacked cans.

Figures 16, 18, 19:
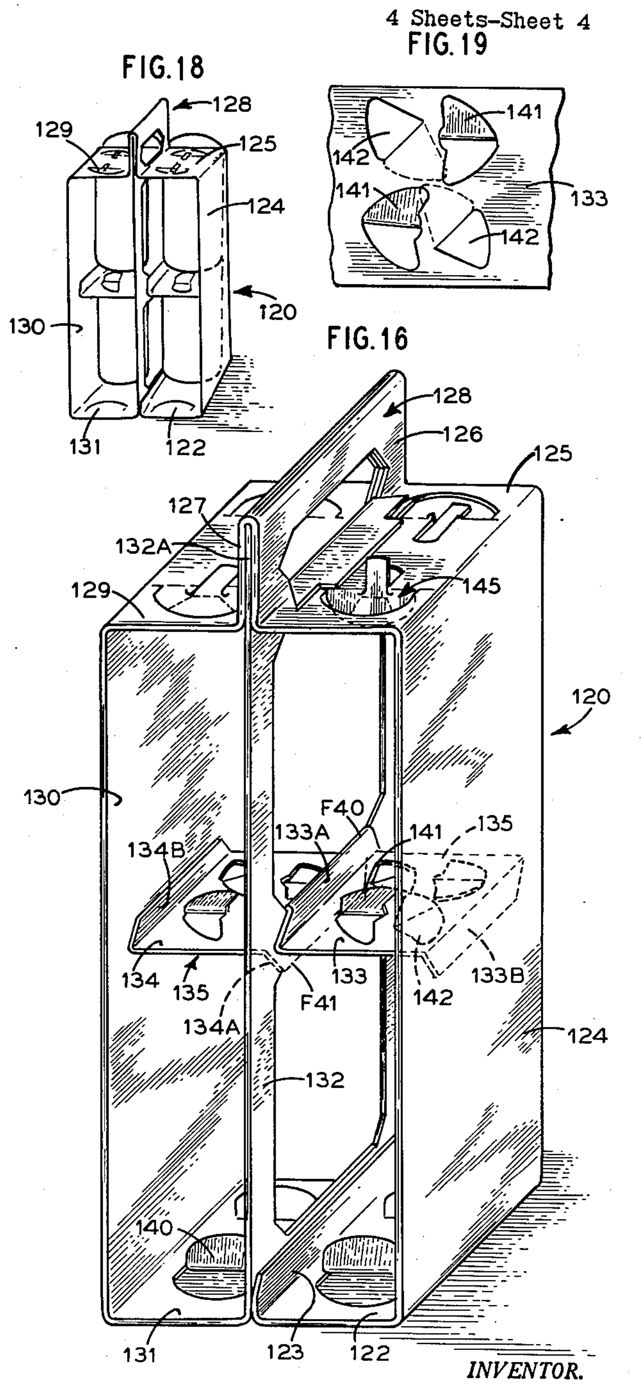

FIG. 16 is a perspective view of another modified can wrapper type carrier.

Figure 17:
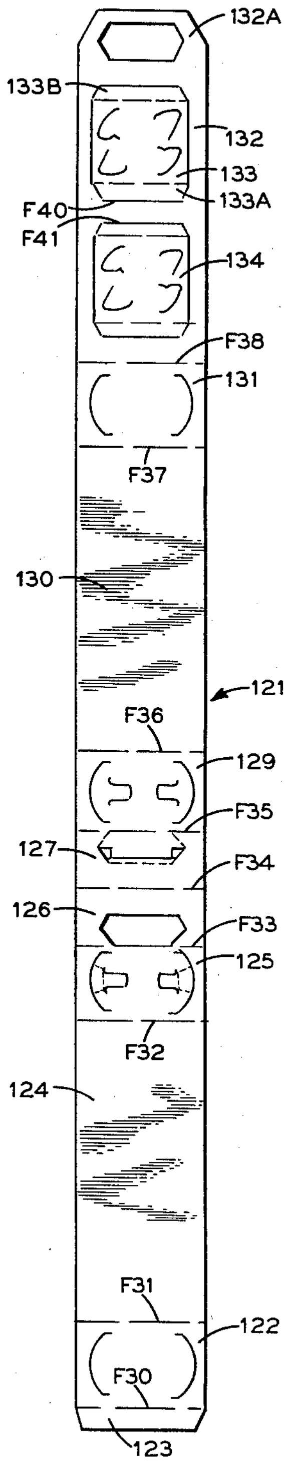

FIG. 17 illustrates a plan view of the single blank of sheet material of which the carrier of FIG. 16 is formed.

FIG. 18 illustrates a perspective view of the carrier of FIG. 16 shown in reduced scale and with some of the cans removed therefrom.

FIG. 19 is a detail plan view of the can retaining flap employed in a carrier for containing stacked cans.

Figure 20:
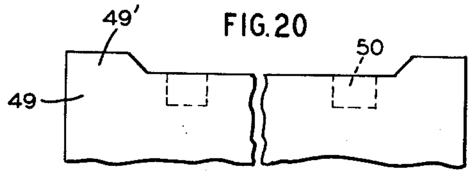

FIG. 20 is a front elevational view of a premium or bonus holder showing the die cut structure, the lower portion being broken away.

Figure 2:
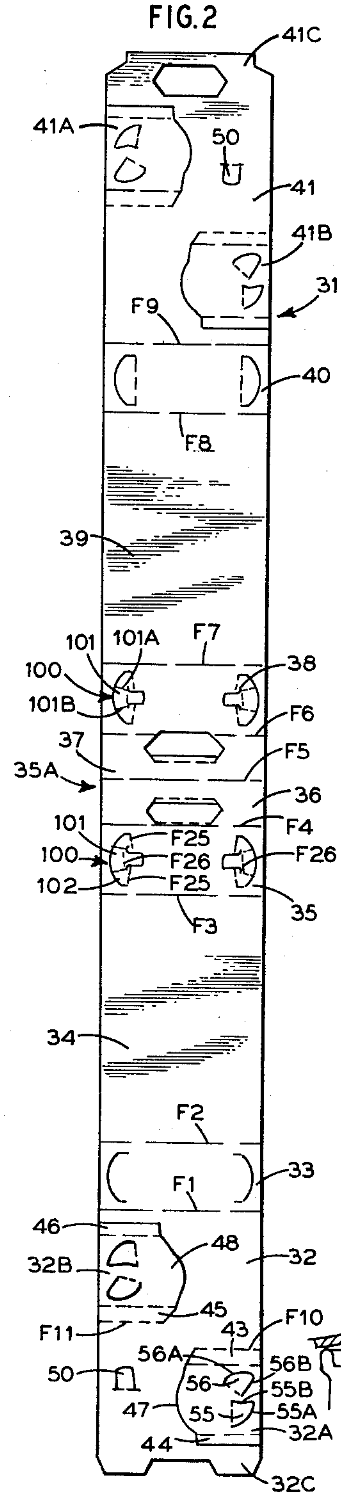
FIG. 2 is a plan view of the preformed blank from which the carrier of FIG. 1 is formed.

Referring to FIGS. 1 and 2, there is shown for purposes of illustration only, a wrapper type can carrier 30 which is constructed and arranged to carry a plurality of cans in stacked relationship. While the illustrated embodiment is constructed to carry twelve cans, it will be understood that the inventive concept need not be limited thereto, for it is readily apparent that a carrier embodying the instant concept may be designed to accommodate any even number of stacked cans.

According to this invention the can wrapper carrier or carton 30 of FIG. 1 is formed of a single blank of sheet material 31, such as paperboard, cardboard, or the like. FIG. 2 illustrates the details of the preformed single blank 31.

Essentially blank 31 is substantially rectangular in form and is formed with a plurality of transversely extending foldlines F1, F2, F3, F4, F5, F6, F7, F8 and F9, to partition the blank into several panels 32 to 41 integrally connected in edge to edge relationship. The several panels 32 to 41 comprise a half bottom wall segment 33, an intermediate panel 32 connected along one edge of the bottom half segment along foldline F1, and a side panel 34 connected to the other edge of the bottom segment 33 along foldline F2. A top wall panel 35A is connected to the side panel 34 along foldline F3. As shown the top panel 35A is formed of top segments 35, 38 having integrally formed reverse folds 36, 37 folded about foldlines F4 to F6 to define a handle loop 42 that extends across the top of the wrapper. Connected to top panel portion 38 is the other side wall panel 39 foldable along foldline F7, and the other bottom half segment 40 being foldable about foldline F8 at the bottom of side panel 40. Foldable about foldline F9 is a second intermediate panel 41.

In the folded position of the blank sheet 31, as shown in FIG. 1, it will be seen that the first and second intermediate panels 32 and 41 are disposed in back to back relationship and extend between the top wall 35A and bottom wall segments 33, 40 to divide the carrier 30 into two equal half sections.

As shown the ends 32C and 41C of the respective intermediate panels 32, 41 extend between the reverse folds 36, 37 which define handle loop 42, suitable cut outs being provided to form a hand opening to facilitate carrying.

In accordance with this invention the heights of the side wall panels 34, 39 are proportioned to receive cans disposed in stacked relationship one on the other, in each half section of the carrier. To support and position the cans in stack position, means are provided for forming an intermediate partition or shelf extending between the intermediate panels 32, 41 and opposite side panels 34, 39.

In accordance with this invention each of the intermediate panels 32, 41 is provided with diagonally disposed cut out quarter portions 32A, 32B, 41A, 41B, respectively. As seen in FIG. 1, the upper quarter portion 32A is folded downwardly along foldline F10. The arrangement is such that cut out quarter portions 32A are formed with end flanges 43, 44 folded at right angles. Flange 43 is folded about foldline F10 so as to abut against the connected intermediate panel portion 32, and flange 44 abuts against the opposite side wall 34. Suitable glue or bonding cement is used to secure flange 44 to the side panel 34.

The lower quarter portion 32B is folded upwardly along foldline F11. Quarter portion 32B likewise is formed with end flanges 45, 46 for abutting against the intermediate panel 32 and opposite side wall 34, similarly as hereinbefore described with reference to 32A. It will be noted that the inner edges 47, 48 of the respective quarter portions 32A, 32B overlap one another. In this manner greater rigidity of the intermediate horizontally disposed shelf-like structure is attained. However, tests have shown that the inner edges of the shelf structure formed by the transversely extending quarter portions need not overlap.

The quarter portions 41A, 41B are similarly constructed to extend across the other section of the carrier, and therefore need not be further described.

Therefore, it will be apparent that cans can be stacked in the carrier described both above and below the shelf formed by the respective quarter portions 32A,B, and 41A,B. In the illustrated embodiment twelve cans may be packed therein, three in each of the quarter sections defined thereby.

In accordance with this invention the top 35A, bottom segments 33, 40 and intermediate shelf construction defined by the respective quarter portions 32A, 32B, and 41A, 41B, are provided with can retaining flaps as will be hereinafter described. Each of the flaps is formed so as to engage with the chime of a can and thus prohibit accidental displacement of the cans. Preferably, the retaining flaps, formed in the respective panels, are positioned for engaging the chimes of the end cans only, the middle can being secured by the retained cans on either side thereof.

With the carrier construction described provision is made for attaching thereto a premium or bonus article 49, such as a record, picture, booklet, or any other suitable desirable flat article. In accordance with this described carrier 30, the ends of the intermediate panels 32, 41 are secured between the folds 36, 37 of handle 42. Each half section of the carton or carrier is thus complete unto itself and may be laterally displaced.

In accordance with this invention the premium article 49, such as a record or the like, is disposed between the intermediate panels 32, 41, and thereafter the bottom portions of the intermediate panels are either glued to the record envelope disposed therebetween or otherwise secured together, as shown in FIGS. 5 to 7.

A locating flap 50 is formed in the respective intermediate panels 32 and 41 to hold and locate the upper end of the record envelope or bonus article 49 in place. Record envelope 49 is die cut as shown in FIG. 20 with projections 49' so that when flap 50 is placed either between the sides of holder 49 or over the edges of both sides the envelope 49 cannot be removed without breaking the carton seal as hereinafter described. Thus, the described carrier lends itself for use either with or without the premium. In either case, the carrier described may be folded flat for shipment to a cannery where the carrier is subsequently squared and filled. If a bonus article 49 is to be attached, it is positioned between panels 32 and 41, before or after the cans are loaded.

FIGS. 5, 6 and 7 illustrate alternate means by which the two sections of the carrier may be secured together. In FIG. 5 each section has a tab 51 cut out of the respective intermediate panel 32, 41. The tabs 51 are folded so as to extend normal thereto to overlie the opposed bottom panel 33, 40 of the other section of the carrier. The respective tabs 51 are then glued or otherwise secured to the adjacent bottom panels.

FIGS. 6 and 7 illustrate slot and tongue type tabs by which the two sections of the carrier 30 may be secured. In FIG. 6, each section has its bottom wall segment 40' provided with a cut out tab 52 having wing portions 52A and a slot 53 spaced therefrom, whereas the other bottom wall segment 33' is provided with a cooperating slot 53 to receive the wing tab 52, and spaced therefrom a tab 52 to be received in slot 53 in bottom segment 40'.

The arrangement of FIG. 7 is similar to that of FIG. 6, except for the spade shape of the tab 54.

In accordance with this invention the intermediate quarter portions 32A, 32B, 41A, 41B of the intermediate panels 32 and 41, which form the intermediate shelf construction of the respective carrier sections, are provided with can retaining flaps 55 and 56 for engaging the chimes of the cans stacked above and below the respective quarter portions. As shown, these flaps 55, 56 are each cut from their respective quarter portions. Each flap 55, 56 is formed so as to have an arcuate peripheral edge portion 55A, 56A conforming substantially to the shape of a can chime, and a radial edge portion 55B, 56B. The arcuate periphery 55A, 56A of each flap 55, 56 is substantially the equivalent of a 90° arc of a circle. As shown, each flap is adapted to be reversely folded in opposite directions so that one will lie against the upper surface of its respective quarter portion, and the other flap reversely bent so as to underlie the quarter portion.

As best seen in FIG. 1, in the reversely folded position of the can retaining flaps 55, 56, the outer tips of the flaps overlap.

To minimize obstruction to the cans during a loading operation, the radial edge 56B of one of the flaps is formed with a V notch. See FIG. 2. Experiments have shown that forming one of the flaps with a V in its radial edge faciltates the loading operation, and prohibits the flap from returning to the plane of its quarter portion. Also with flaps 55, 56 constructed as described a relative large arcuate shaped periphery edge is attained so as to more firmly hold the cans in position, and a sturdier carrier is attained.

FIG. 8 illustrates a modified flap construction for use in the intermediate shelf portion of the carrier. As shown, a pair of flaps 60, 61 are cut out of its respective shelf forming portion 62 so as to have an arcuate peripheral edge portion 60A, 61A and an inner radial edge portion 60B, 61B. The radial edge of each flap is disposed adjacent one another. The arrangement is such that each flap 60, 61 is reversely folded about a foldline F13, F14, but in opposite directions. In this form, a tail tab 64, 65 is formed at the junction of the foldline F13, F14 and the end of the peripheral arcuate edges 60A, 61A respectively of each flap. The arrangement is such that when the respective flaps 60, 61 are reversely folded into operative position, the tail tab portions 64, 65 thereof are disposed so as to be positioned either above or below the shelf portion 62, and thus function as a stop to prevent the respective flaps 60, 61 from returning to the plane of the shelf portion 62. This is an important consideration during a loading operation, when the cans are rolled into position within the carrier. With this construction proper positioning of the flaps is assured during a can loading operation.

Another modified construction of a flap for use in the shelf portion of the carrier described is shown in FIG. 9. In this form, the flaps 70 and 71 are similar to that of FIG. 8, described above, except that the tail tab portions 72 thereof are formed at the junction of the radial edges 70A, 71A and the foldlines F14, F15 of the respective flaps. In function and operation flaps 70, 71 are similar with those of FIG. 8, as described.

FIGS. 10 to 12 illustrate a further modified can retaining flap construction for use in the wrapper described in which cans are stacked. As seen in FIG. 10 the intermediate shelf forming portion 75 of the carrier of the type described has cut therein a major flap 76 having an arcuate edge portion 76A foldable about foldline F20. Spaced from foldline F20 is a parallel foldline F21 about which a minor flap 77 is folded. As shown, the minor flap 77 is also provided with an arcaute edge 77A portion opposite its foldline F21.

In operation the major flap 76 is reversely folded about its foldline F20, as seen in FIGS. 11 and 12, so as to lie against the under-surface of the shelf portion 75, and thus functions to engage the chime portion 78 of a lower can 79. The minor flap 77 is folded about its foldline F21 so as to be slightly raised above the surface of the shelf portion 75 of the carrier an amount sufficient to engage the chime 80 of the upper stacked can 81.

In operative position, as shown in FIG. 12, it will be noted that the arcuate peripheral edge portions 76A, 77A of both major and minor flaps 76, 77 are substantially coincident, and spaced slightly above and below the respective surfaces of the shelf portion 75 of the wrapper carrier.

To facilitate positioning of the minor tab 77 in position to engage the chime 80 of a can 81, a radial crease line 82 is preformed therein. This crease line 82 will give a slight bow effect to the flap 77 when folded out of the plane of the shelf portion 75, and thus resists the tendency of flap 77 to return to the plane of the shelf 75 during a loading operation. With this described construction, a greater peripheral arc 76A, 77A is provided for engaging a greater circumferential portion of chimes of the respective cans 79, 81.

FIGS. 13 to 15 illustrate a further modification of a flap construction which may be used in a carrier of the type described, in which cans are stacked. In this form the shelf portion 85 formed out of the respective intermediate panels 32, 41 are formed with a blanked out major flap 86 which has a relative large arcuate peripheral edge portion 86A foldable about foldline F22. Cut out of the plane of the major flap 86 is a minor flap 87. As shown, the minor flap 87 has a relatively smaller, oppositely bowed arcuate edge portion 87A which is foldable about a foldline F23 formed in the plane of the major flap 86. See FIG. 13. Spaced from the foldline F22 the shelf portion 85 is provided with a slot or split 88 which is equal to the length of the width of the minor flap 87.

In the operative position the major flap 86 is reversely folded about its foldline F22. With the major flap 86 reversely folded, the minor flap 87 is positioned so that it projects upwardly through the slot or split 88 so that it extends to the other side of the shelf 85. The minor flap 87 is then folded so that its arcuate edge portion 87A is disposed in spaced coincidence with the arcuate edge 86A of the major flap 86. Thus, it will be noted that in operation and function, it is similar to the flap 76, 77 construction of FIGS. 10 to 12, as described.

As shown in FIG. 15, the major flap 86 serves to engage the chime 89 of one can 90, and the minor flap 87 serves to engage the chime 91 of can 92 stacked thereon. While the major flap 86 is herein illustrated as being folded under portion 85, it will be understood that the folds of the respective flaps 86, 87 can be reversed without affecting the operation thereof.

To facilitate individual removal of the cans from the carrier described easily and quickly and without resulting damage to the carrier 30, an improved release flap 100 is provided. For a detail description of the construction of flap construction 100, reference is made to my co-pending application Ser. No. 145,678, filed October 17, 1961.

Briefly, this flap construction 100 comprises essentially a can retaining portion 101 which has an arcuate peripheral edge portion 102 adapted to be folded about a foldline F25. A grip tab portion 103 is integrally connected to the can retaining portion 101, and both are precut out of the top portions 35 and 38 of the carrier 30, as seen in FIGS. 1 and 2. The arrangement is such that when the flap 100 is folded in can retaining position, the tab portion 103 is folded so as to extend outwardly of the carrier. Accordingly, the tab 103 is preferably folded about a foldline F26 formed at the base portion of the tab 103 formed in the plane of can retaining portion 101. Thus it will be noted that the tab is cut down to its base portion and into the plane of the flap 100 a distance sufficient so that the tab portion 103 will extend upwardly through the space 103A in the top portions 35, 38 of the carrier. With this flap construction 100, as best seen in FIGS. 3 and 4, a grip is provided so that when a pulling force is applied to the tab 103, the can retaining flap portion 101 and the portion of the top panel 35, 38 overlying the same will bow, thus causing the retaining portion 101 to be free from the chime 105 of the can 106. With the can retaining portion 101 so dislodged, from the chime 105 of the can 106, the latter can then be easily removed from the wrapper carrier simply and quickly, without resulting damage to the carrier. While not shown, it will be understood that a quick releasable flap 100 as described may be formed in the bottom wall segment also, if desired.

To facilitate flexing of the can retaining flap portion 101 when the tab 103 is pulled, a pair of radially extending crease lines may be provided. As shown these crease lines 101A, 101B extend radially outwardly from the base of the tab 103 to the periphery 102 of the flap 101.

The retaining flaps 108 illustrated in bottom wall segments 33, 40 are conventional.

FIGS. 17 to 19 illustrate a modified carrier 120 for retailing canned goods in stacked relationship. It is to be noted that this construction is made to accommodate eight cans; however it will be understood that the carrier 120 may be proportioned to carry any practical multiple of four cans.

The carrier 120 of FIG. 16 is formed of a single blank of preformed sheet material 121 such as paperboard or cardboard, as shown in FIG. 17. The blank 121 comprises an elongated sheet having a plurality of transversely extending foldlines F30 to F38 for partitioning the blank into a half bottom segment 122, a connected marginal panel 123, a connected side panel 124, a top panel section 125 connected thereto and having integrally connected reverse folds 126, 127 to define a handle loop 128, another top panel portion 129, a connected side panel 130, the other half bottom segment 131 and an intermediate panel 132. In the folded position of the carrier, as seen in FIG. 16, the intermediate panel 132 extends upwardly between the bottom and top panels of the carrier, with the upper end 132A of the intermediate panel 132 secured between the reverse folds 126, 127 of the handle portion 128. As shown, the handle folds 126, 127 and upper end of the intermediate panel 132A each have an aligned opening to form a hand grip to facilitate carrying the same.

In accordance with this invention, the intermediate panel 132 is provided with an upper and lower cut-out portion 133 and 134 foldable about their respective foldlines F40, F41 so as to extend in opposite directions to define a shelf 135 intermediate the height of the carrier.

It will be noted that the upper portion 133 is folded about foldline F40. As shown in FIG. 16, the cut-out portion defining the shelf 135 is formed with an integrally connected flange portion 133A which abuts against the intermediate panel 132 beneath the foldline F40, and thence extends laterally toward the opposite side wall 124 where it terminates in another flange 133B in abutting relationship to the side wall panel 124. A suitable glue or other bonding cement secures the flange 133B to the side panel 124.

The lower cut-out portion 134 is folded upwardly about foldline F41. This portion 134 is likewise formed with an integral flange 134A abutting the intermediate panel 132 above the foldline F41, and thence it extends laterally toward the other side panel 130 where it terminates in a flange 134B abutting the side panel 130.

With this construction it will be apparent that a major portion of the intermediate panel 132 is open area due to the cut-out portion bent out of the plane thereof to define the shelf. This open area in turn facilitates cooling of cans, if refrigeration is required of the canned product packaged therein.

As hereinbefore described, the top panel sections 125, 129, bottom wall segments 122, 131, and intermediate shelf portions 133, 134 are each formed with aligned can retaining tabs or flaps. The flaps 140 in the bottom wall segments 122, 131 may be conventional. The flaps 141, 142 of the intermediate panels 133, 134 may assume any of the described forms as illustrated in FIGS. 8, 9, 10 to 15, and 19.

However, in the illustrated embodiment of FIG. 16, the tabs 141, 142 are constructed as arranged in the same manner as described with respect to the flaps 55, 56 of FIGS. 1 and 2. Therefore, further description of them is not deemed necessary. It is to be observed, however, that in their reversely folded position, flaps 141 and 142 have their ends remote from their respective foldlines in overlapping relationship as best seen in FIG. 19.

The retaining flaps 145 in the top panel portions 125, 129 are similar to the quick release flap 100 hereinbefore described with reference to FIGS. 1 and 2.

For the foregoing description it will be apparent that either of the embodiments disclosed is relatively simple to manufacture, and that it makes a convenient portable package capable of distributing more cans per package than the now commonly known commercially acceptable packages. The instant wrapper type carrier further requires less paperboard than many of the more popular constructions per unit can distributed thereby.

Also because of valuable shelf space of various retail outlets, the carrier herein described for vertically stacked cans enables the user thereof to acquire a merchandising advantage in that more of the instant package or carrier is visible to a prospective purchaser.

Also each of the carriers has an improved quick releasable can retaining flap to facilitate individual removal of the cans therefrom.

In addition, the instant invention discloses several novel constructions of intermediate retaining flaps which render the stacking of cans within a single carrier possible. Not only are they constructed to retain cans disposed in stacked relationship, but also they are constructed and arranged to facilitate loading of the cans, while at the same time preventing return of the flap back to the plane of the intermediate shelf parts defined by the respective cutouts 133, 134.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. In a wrapper type can carrier having opposed top, bottom and side wall panels defining a rectangular closed figure having open ends, the improvement of an intermediate panel disposed midway between and parallel said top and bottom panels to define a shelf for the tier storage of cans therein, can retaining flaps formed in said top and bottom panels and foldable relative thereto inwardly of said carrier to lie against the inner surface of their respective panels for engaging the chime of a can, and said intermediate panel having retaining flaps formed therein for cooperating with the flaps of said top and bottom panels for retaining cans stacked in tiers above and below said intermediate panel the flaps in said intermediate panel comprising a pair of substantially quarter circle flaps cut out of said intermediate panel, each of said flaps being reversely folded about a foldline so that one of said pair overlies said intermediate panel and the other underlies said intermediate panel so that in the folded position of said flaps the arcuate portions thereof engage the chime of a can for retaining the same stacked above and below said intermediate panel, said flaps being constructed and arranged so that the outermost tips thereof overlie one another to add reinforcement to said panel.

2. The invention as defined in claim 1 wherein each of said flaps has a radial edge portion, and the radial edge portion of said flaps being V-shaped to provide a high point to engage the leading edge of the can chime to facilitate passage of the cans during a loading operation with a minimum of obstruction.

3. In a wrapper type can carrier having opposed top, bottom and side wall panels defining a rectangular closed figure having open ends, the improvement of an intermediate panel disposed midway between and parallel said top and bottom panels to define a shelf for the tier storage of cans therein, can retaining flaps formed in said top and bottom panels and foldable relative thereto inwardly of said carrier to lie against the inner surface of their respective panels for engaging the chime of a can, and said intermediate panel having retaining flaps formed therein for co-operating with the flaps of said top and bottom panels for retaining cans stacked in tiers above and below said intermediate panel wherein at least one of said flaps blanked from said intermeditae panels has a tail portion cut out of said intermediate panel so that in the folded position of said flap the tail portion tends to prohibit return of said flap to the plane of said panel.

4. In a wrapper type can carrier having opposed top, bottom and side wall panels defining a rectangular closed figure having open ends, the improvement of an intermediate panel disposed midway between and parallel said top and bottom panels to define a shelf for the tier storage of cans therein, can retaining flaps formed in said top and bottom panels and foldable relative thereto inwardly of said carrier to lie against the inner surface of their respective panels for engaging the chime of a can, and said intermediate panel having retaining flaps formed therein for co-operating with the flaps of said top and bottom panels for retaining cans stacked in tiers above and below said intermediate panel wherein one of said flaps blanked from said intermediate panel has a tail portion cut out of said panel so that in the folded position of said flap the tail portion tends to prohibit return of said flap to the plane of said panel.

5. In a wrapper type can carrier having opposed top, bottom and side wall panels defining a rectangular closed figure having open ends, the improvement of an intermediate panel disposed midway between and parallel said top and bottom panels to define a shelf for the tier storage of cans therein, can retaining flaps formed in said top and bottom panels and foldable relative thereto inwardly of said carrier to lie against the inner surface of their respective panels for engaging the chime of a can, and said intermediate panel having retaining flaps formed therein for co-operating with the flaps of said top and bottom panels for retaining cans stacked in tiers above and below said intermediate panel wherein the retaining flaps of said intermediate panel comprise a major flap having an arcuate edge portion, adapted to engage the chime of a can cut out of the plane of said panel, said major flap being adapted to be reversely folded about a foldline so as to lie against one side of said panel, a minor flap cut out of the plane of said major flap, said minor flap having an arcuate peripheral edge and foldable about a foldline disposed in the plane of said major flap, and said intermediate panel having a slot formed therein through which said minor flap is inserted in the folded position of said major flaps whereby the arcuate peripheral edges of said minor flap and major flaps are disposed on opposite sides of said panel and each being respectively adapted for engaging the chime of a can stacked above and below said panel.

6. In a wrapper type can carrier having opposed top, bottom and side wall panels defining a rectangular closed figure having open ends, the improvement of an intermediate panel disposed midway between and parallel said top and bottom panels to define a shelf for the tier storage of cans therein, can retaining flaps formed in said top and bottom panels and foldable relative thereto inwardly of said carrier to lie against the inner surface of their respective panels for engaging the chime of a can, and said intermediate panel having retaining flaps formed therein for co-operating with the flaps of said top and bottom panel for retaining cans stacked in tiers above and below said intermediate panel wherein the retaining flaps of said intermediate panel comprise similarly constructed major and minor flaps cut out of said panel, each of said flaps having oppositely disposed arcuate peripheral edge portions, said major flap being reversely folded relative to said panel about a foldline so that the respective arcuate peripheries of each flap are disposed in substantial coincidence, and said minor flap being folded about a foldline so that its arcuate periphery is raised slightly above the plane of said panel.

7. The invention as defined in claim 6 wherein said minor flap has a radially extending medial foldline to resist tendency of said minor flap to bend back into the plane of said panel.

8. A foldable wrapper type can carrier comprising a top panel, bottom panel and connecting opposed side panels defining a rectangular closed figure having open ends, an intermediate panel extended between the top and bottom panels and disposed midway between and parallel to the opposed side panels, said intermediate panel having an integral connected cut out portion folded about a foldline so as to extend transversely between said intermediate panel and one of said side panels to provide a shelf for tier storage of cans within said carrier, means for connecting the said folded cut out portion to said one side panel, a can retaining flap cut out of said top and bottom panel, and said cut out portion having a pair of can retaining flaps notched out and reversely folded so that one of said pair of flaps folds over and the other under the intermediate cut out portion to cooperate with the can retaining flaps in the top and bottom panels respectively to retain cans stacked in tiers above and below said cut out portion within said wrapper.

9. A foldable can carrier formed from a single blank of sheet material comprising a bottom half wall segment, a first intermediate panel folded about a foldline extending along one edge of said bottom half wall segment, an upright side wall panel foldable about a foldline extending along the other edge of said bottom half wall segment, a top wall folded along a foldline adjacent the upper end of said side wall, a reversely folded vertically disposed integrally attached handle fold extending transversely along a medial foldline in said top wall, another side wall attached along a foldline extending along the other edge of said top wall, the other bottom half wall segment attached along a foldline extending along the bottom edge of said other side wall, and a second intermediate panel attached along the edge of said latter bottom half wall segment, each of said intermediate panels being disposed back to back and parallel to said side walls, and each of said intermediate panels having its upper ends disposed between the reverse bends of said handle folds, a flat premium article disposed between said intermediate panels, and means for retaining said article between said intermediate panels.

10. A foldable can carrier formed from a single blank of sheet material comprising a bottom half wall segment, a first intermediate panel folded about a foldline extending along one edge of said bottom half wall segment, an upright side wall panel foldable about a foldline extending along the other edge of said bottom half wall segment, a top wall folded along a foldline adjacent the upper end of said side wall, another side wall attached along a foldline extending along the other edge of said top wall, the other bottom half wall segment attached along a foldline extending along the bottom edge of said other side wall, and a second intermediate panel attached along the edge of said latter bottom half wall segment, each of asid intermediate panels extending between the top and bottom of said carrier being disposed back to back and parallel to said side walls to divide said carrier into two half sections, a flat premium article disposed between said intermediate panels, and means for retaining said article between said intermediate panels.

11. The invention as defined in claim 10 wherein said premium article comprises a record, and said intermediate panels having retaining flaps for securing said record between said intermediate panels.

12. A foldable wrapper type can carrier formed from a single blank of sheet material comprising a bottom half wall segment, a first intermediate panel folded about a foldline extending along one edge of said bottom half wall segment, an upright side wall panel foldable about a foldline extending along the other edge of said bottom half wall segment, a top wall folded along a foldline adjacent the upper end of said side wall, reversely folded vertically disposed integrally attached handle folds extending transversely along a medial foldline in said top wall, another side wall attached along a foldline extending along the other edge of said top wall, a second bottom half wall segment attached along a foldline extending along the bottom edge of said other side wall, and a second intermediate panel attached along the edge of said second bottom half wall segment, each of said intermediate panels being disposed back to back and parallel to said side walls, and each of said intermediate panels having its upper ends disposed between reverse folds of said handle loop to divide said carrier into two half sections, each of said intermediate panels having diagonally disposed upper and lower quarter portions cut out and folded about a transverse foldline to extend between its respective intermediate panel and oppositely disposed side wall to provide therebetween a shelf disposed parallel to said top wall and bottom wall segment in each half section of said carrier for the tier storage of cans therein, means for connecting each of said quarter cut outs to the respective side wall panels, the diagonal quarters cut out of one intermediate panel being converse to the cut out quarters of the other intermediate panel, aligned can retaining flaps cut out in each of the bottom wall segments and opposed top wall, and each of said quarter cut outs having cooperating can retaining flaps notched therein and folded relative thereto to cooperate with the can retaining flaps aligned therewith in the top wall and bottom wall segments respectively so as to retain cans stacked in tiers above and below the shelf formed by said cut out quarters within the wrapper carrier.

13. A foldable wrapper type can carrier formed from a single blank of sheet material comprising a bottom half wall segment having a marginal flap folded about a foldline extending along one edge of said bottom half wall segment, an upright side wall foldable about a foldline extending along the other edge of said bottom half wall segment, a top wall folded along a foldline adjacent the upper end of said side wall, a reversely bent vertically disposed integrally attached handle fold extending along a transverse medial foldline in said top wall, another side wall attached along a foldline extending along the other edge of said top wall, another bottom half wall segment attached about a foldline extending along the bottom edge of said other side wall, and an intermediate panel attached along the edge of said latter bottom half wall segment, said intermediate panel being disposed midway and parallel to said side walls and having its upper end disposed between the reverse folds of said handle loop, said marginal flap being secured to said intermediate panel to complete the can wrapper carrier, an upper and lower shelf forming portion cut out of said intermediate panel, each of said shelf forming portions being folded about respective foldlines so as to extend in opposite directions between the intermediate panel and the respective said walls, means connecting the free end of each shelf cut out to the opposite side wall to provide for tier storage of cans above and below said shelves within said carrier, and cooperating can retaining means formed in top wall, bottom segments and intermediate cut out shelf-forming portions to retain cans disposed above and below said shelf portions within said carrier.

14. A foldable wrapper type can carrier formed from a single blank of sheet material comprising a bottom half wall segment, an upright side wall foldable about a foldline extending along an edge of said bottom half wall segment, a top wall folded along a foldline adjacent the upper end of said side wall, another side wall attached along a foldline extending along the other edge of said top wall, another bottom half wall segment attached about a foldline extending along the bottom edge of said other side wall, and an intermediate panel attached along the edge of said latter bottom half wall segment, said intermediate panel being disposed midway and parallel to said side walls to divide said carrier into two half sections, means for securing said half sections together, an upper and lower shelf forming flap cut out of said intermediate panel, each of said shelf forming flaps being folded about respective foldlines so as to extend in opposite directions from the intermediate panel to each of the opposite said walls, means connecting the free end of each shelf forming cut out to its respective side wall to provide for tier storage of cans above and below said shelf forming portion within said carrier, and cooperating can retaining means formed in top wall, bottom segments and intermediate cutout shelf portions to retain cans disposed above and below said shelf forming portions within said carrier.

15. The invention as defined in claim 14 wherein said can retaining means in the top wall include means for rendering said retaining means releasable from the chime of a can retained thereby.

16. The invention as defined in claim 15 wherein said latter means include a pull tab.

References Cited in the file of this patent

UNITED STATES PATENTS

| | | |
|---|---|---|
| 2,146,226 | Punte | Feb. 7, 1939 |
| 2,571,833 | Chidsey | Oct. 16, 1951 |
| 2,714,448 | Brown | Aug. 2, 1955 |
| 2,812,105 | Parker | Nov. 5, 1957 |
| 2,832,504 | Foster | Apr. 29, 1958 |
| 2,874,869 | Hennessey | Feb. 24, 1959 |
| 3,049,282 | Chidsey et al. | Aug. 14, 1962 |